United States Patent
Hayashi

(10) Patent No.: US 10,162,054 B2
(45) Date of Patent: Dec. 25, 2018

(54) DISTANCE MEASURING DEVICE

(71) Applicant: Rakuten, Inc., Tokyo (JP)

(72) Inventor: Yasuyuki Hayashi, Tokyo (JP)

(73) Assignee: Rakuten, Inc., Setagaya-ku, Tokyo (JP)

(*) Notice: Subject to any disclaimer, the term of this patent is extended or adjusted under 35 U.S.C. 154(b) by 379 days.

(21) Appl. No.: 14/914,779

(22) PCT Filed: Sep. 6, 2013

(86) PCT No.: PCT/JP2013/074077
§ 371 (c)(1),
(2) Date: Feb. 26, 2016

(87) PCT Pub. No.: WO2015/033436
PCT Pub. Date: Mar. 12, 2015

(65) Prior Publication Data
US 2016/0209508 A1    Jul. 21, 2016

(51) Int. Cl.
| | |
|---|---|
| *G01S 15/00* | (2006.01) |
| *G01S 15/10* | (2006.01) |
| *G01S 15/02* | (2006.01) |
| *G01S 7/527* | (2006.01) |
| *G01S 15/88* | (2006.01) |

(52) U.S. Cl.
CPC .............. *G01S 15/10* (2013.01); *G01S 7/527* (2013.01); *G01S 15/025* (2013.01); *G01S 15/88* (2013.01)

(58) Field of Classification Search
USPC ......................................................... 367/99
See application file for complete search history.

(56) References Cited

U.S. PATENT DOCUMENTS 4,935,619 A * 6/1990 Heberle ............. C08G 18/4252
                                                   250/221
2010/0286911 A1* 11/2010 Yang ...................... G01C 21/00
                                                   701/472
(Continued)

FOREIGN PATENT DOCUMENTS

JP          20132955 A       1/2013

OTHER PUBLICATIONS

English Translation of JP2013-002955.*
(Continued)

*Primary Examiner* — James R Hulka
(74) *Attorney, Agent, or Firm* — Sughrue Mion, PLLC

(57) ABSTRACT

A distance measuring device that can identify a reflected wave by a target object as a measurement target from among reflected waves when the reflected waves are observed in response to one output wave. The device transmits an output wave plural times from a speaker while moving, and acquires waveform data of a sound wave that is received by a microphone every time the output wave is transmitted and includes plural reflected waves caused by reflection of the output wave. Furthermore, the distance measuring device identifies a reflected wave by the target object as the measurement target from among the plural reflected waves according to change in the reception timing of each of the plurality of reflected waves included in each of plural pieces of the acquired waveform data, and calculates the distance to the target object on the basis of the reception timing of the identified reflected wave.

10 Claims, 5 Drawing Sheets

(56) References Cited

U.S. PATENT DOCUMENTS

2012/0099401 A1\* 4/2012 Yamashita .............. G01S 3/808
367/118
2012/0139723 A1\* 6/2012 Avila ................. G08B 21/0269
340/539.13

OTHER PUBLICATIONS

International Search Report, issued by the International Searching Authority in corresponding International Application No. PCT/JP2013/074077, dated Oct. 8, 2013.
International Preliminary Report on Patentability issued from the International Bureau in counterpart International Application No. PCT/JP2013/074077, dated Oct. 8, 2013.
Sonar Ruler, The labs @ Laan, https://web.archive.org/web/20130813021542/http://labs.laan.co, Mar. 29, 2016, pp. 1-4 (4 pages total).

\* cited by examiner

DISTANCE MEASURING DEVICE

CROSS REFERENCE TO RELATED APPLICATIONS

This application is a National Stage of International Application No. PCT/JP2013/074077, filed Sep. 6, 2013, the contents of which are incorporated herein by reference in its entirety.

TECHNICAL FIELD

The present invention relates to a distance measuring device that measures the distance to a target object by using sound waves, a control program thereof, and a distance measuring method.

BACKGROUND ART

A method of measuring the distance to a target object by utilizing sound waves by a distance measuring device including a speaker and a microphone exists (refer to NPL 1 for example). In this method, a reflected wave caused by reflection of a sound wave (output wave), which has been emitted from the speaker, by the target object is received by the microphone. Then, the distance from the distance measuring device to the target object is measured by identifying the time required until the sound wave emitted from the speaker is reflected and reaches the microphone. This method can be realized if the distance measuring device includes the speaker and the microphone. Thus, it is also possible to utilize a smartphone, a tablet, or the like that is commonly prevalent as the distance measuring device for example.

CITATION LIST

Non Patent Literature

NPL 1: Laan Labs, "Sonar Ruler," [online], [retrieved on Aug. 30, 2013], the Internet <URL: http://labs.laan.com/wp/products/sonar-ruler/>

SUMMARY

Technical Problem

If the directionality of the speaker and the microphone included in the above-described distance measuring device is comparatively low, a reflected wave by an object other than the measurement target object is also often received. For example, in the case of attempting to measure the distance to one of wall surfaces surrounding all four sides in an indoor space, the side walls other than the wall deemed as the target, a floor, a ceiling, and so forth will reflect sound waves and plural reflected waves will be observed in response to one output wave. In such a situation, it is impossible to correctly measure the distance to the target object if it is impossible to identify which is the reflected wave from the target object among the observed plural reflected waves.

The present invention is made in view of the above-described circumstances and one of objects thereof is to provide a distance measuring device that can identify a reflected wave by a target object as a measurement target from plural reflected waves when the plural reflected waves are observed in response to one output wave, a control program thereof, and a distance measuring method.

Solution to Problem

A distance measuring device according to the present invention is a distance measuring device that measures the distance to a target object and includes: a speaker; a microphone; output wave transmitting means that transmits an output wave a plurality of times from the speaker while the distance measuring device is moving; waveform data acquiring means that acquires waveform data of a sound wave that is received by the microphone every time the output wave is transmitted and includes a plurality of reflected waves caused by reflection of the output wave; reflected wave identifying means that identifies a reflected wave by the target object from among the plurality of reflected waves according to change in the reception timing of each of the plurality of reflected waves included in each of a plurality of pieces of the acquired waveform data; and distance calculating means that calculates the distance to the target object on the basis of the reception timing of the identified reflected wave.

A distance measuring method according to the present invention is a distance measuring method for measuring the distance to a target object by using a distance measuring device including a speaker and a microphone and includes: a step of transmitting an output wave a plurality of times from the speaker while the distance measuring device is moving; a step of acquiring waveform data of a sound wave that is received by the microphone every time the output wave is transmitted and includes a plurality of reflected waves caused by reflection of the output wave; a step of identifying a reflected wave by the target object from among the plurality of reflected waves according to change in the reception timing of each of the plurality of reflected waves included in each of a plurality of pieces of the acquired waveform data; and a step of calculating the distance to the target object on the basis of the reception timing of the identified reflected wave.

A program according to the present invention is a program for controlling a distance measuring device including a speaker and a microphone to measure the distance to a target object and is a program for causing the distance measuring device to function as: output wave transmitting means that transmits an output wave a plurality of times from the speaker while the distance measuring device is moving; waveform data acquiring means that acquires waveform data of a sound wave that is received by the microphone every time the output wave is transmitted and includes a plurality of reflected waves caused by reflection of the output wave; reflected wave identifying means that identifies a reflected wave by the target object from among the plurality of reflected waves according to change in the reception timing of each of the plurality of reflected waves included in each of a plurality of pieces of the acquired waveform data; and distance calculating means that calculates the distance to the target object on the basis of the reception timing of the identified reflected wave. This program may be stored in a computer-readable information storage medium.

DESCRIPTION OF EMBODIMENT

An embodiment of the present invention will be described in detail below based on the drawings.

Figure 1:
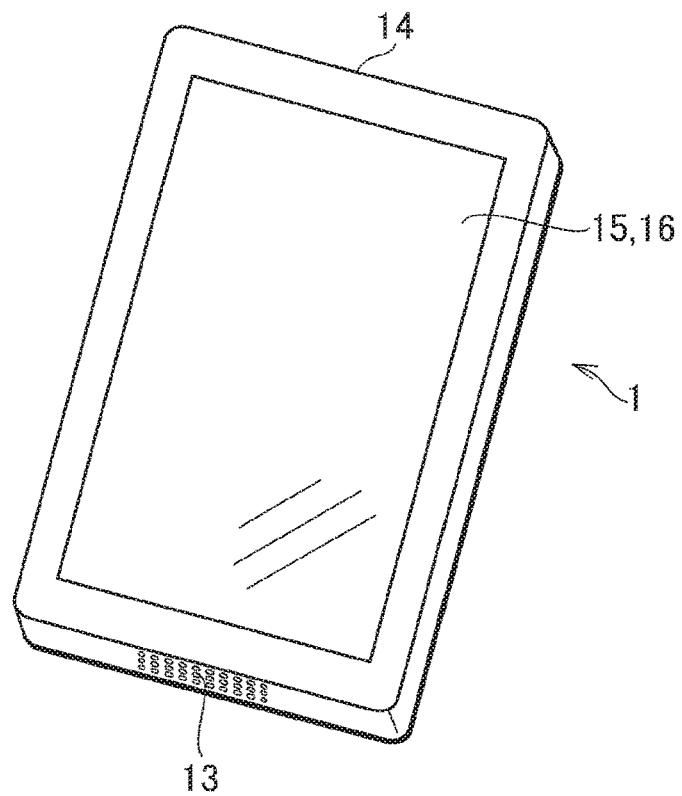
FIG. 1 is a diagram depicting the appearance of a distance measuring device according to an embodiment of the present invention.
Figure 2:
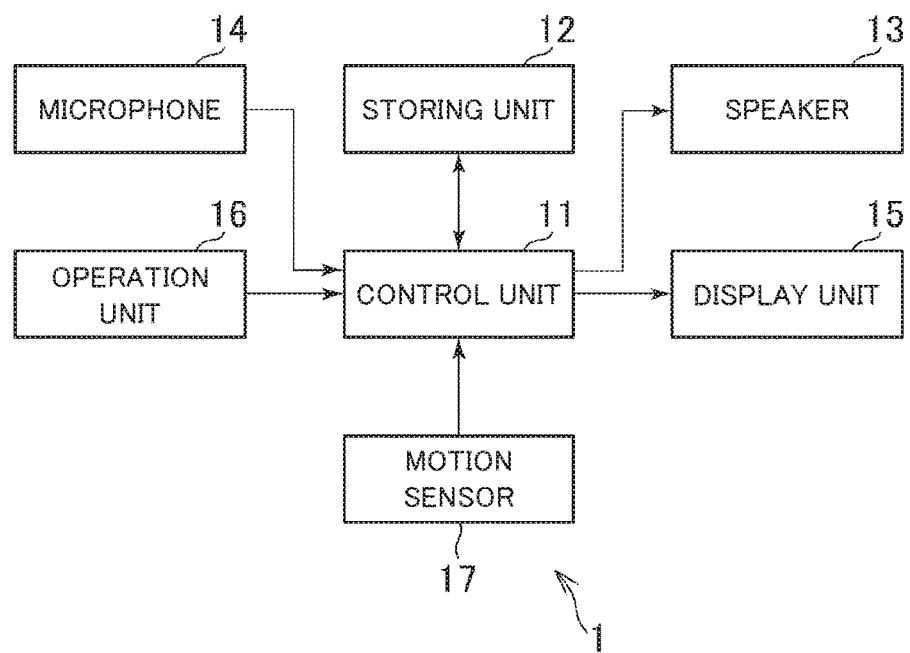
FIG. 2 is a configuration block diagram of the distance measuring device according to the embodiment of the present invention.

A distance measuring device 1 according to the embodiment of the present invention measures the distance to a target object T by using sound waves. FIG. 1 is a diagram depicting the appearance of the distance measuring device 1. Furthermore, FIG. 2 is a configuration block diagram depicting the internal configuration of the distance measuring device 1. As depicted in these diagrams, the distance measuring device 1 is configured to include a control unit 11, a storing unit 12, a speaker 13, a microphone 14, a display unit 15, an operation unit 16, and a motion sensor 17. The distance measuring device 1 according to the present embodiment may be a dedicated device used exclusively for measurement of the distance or may be a general-purpose device (e.g. smartphone, tablet, or the like) including also other functions. Suppose that the distance measuring device 1 is a portable device that can be held with a hand and be moved by a user in the present embodiment.

The control unit 11 is a CPU or the like and executes processing of measuring the distance to the target object T in accordance with a program stored in the storing unit 12. The contents of the processing executed by the control unit 11 will be described later. The storing unit 12 is configured to include a memory element such as a RAM and stores programs to be executed by the control unit 11 and data as a processing target of these programs. The control unit 11 and the storing unit 12 may be implemented by a single integrated circuit such as a microcomputer.

The speaker 13 makes a sound with a specific waveform pattern on the basis of an instruction from the control unit 11. Specifically, in the present embodiment, the speaker 13 transmits sound waves (hereinafter, referred to as the output waves P) used for distance measurement. The microphone 14 collects sounds around the distance measuring device 1. In particular, in the present embodiment, the microphone 14 receives a reflected wave R caused by reflection of the output wave P, which has been emitted by the speaker 13, by an object around the distance measuring device 1.

The display unit 15 is a liquid crystal display panel, an organic EL display panel, or the like and displays various kinds of information including a measurement result in accordance with an instruction from the control unit 11. The operation unit 16 is operation buttons, a touch sensor, and so forth and accepts operation input from a user to output information indicating the contents thereof to the control unit 11.

The motion sensor 17 is an acceleration sensor that detects acceleration applied to the distance measuring device 1 for example, and detects whether or not the distance measuring device 1 is moving or which direction the distance measuring device 1 is moving in with respect to the casing thereof.

Figure 3:
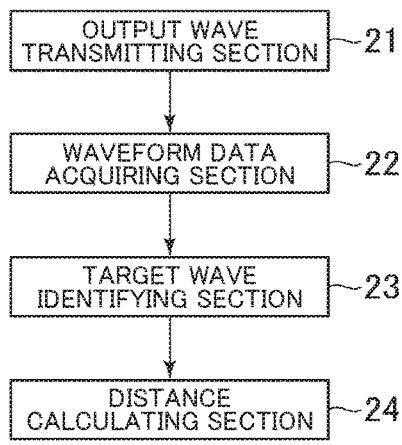
FIG. 3 is a functional block diagram of the distance measuring device according to the embodiment of the present invention.

As depicted in FIG. 3, the distance measuring device 1 according to the present embodiment is configured to functionally include an output wave transmitting section 21, a waveform data acquiring section 22, a target wave identifying section 23, and a distance calculating section 24. These functions are implemented through execution of the program stored in the storing unit 12 by the control unit 11 and control of the speaker 13, the microphone 14, and so forth by the control unit 11. This program may be stored in an information storage medium such as a memory card and be provided to the distance measuring device 1, or may be provided to the distance measuring device 1 via a communication network such as the Internet.

The output wave transmitting section 21 carries out control to transmit the output wave P from the speaker 13. This output wave P may be a wave of an instantaneously-made sound (pulse wave) and be a rectangular wave for example. The output wave P may be an audible-range sound that can be heard by the human ear or may be a sound with such a frequency as to be inaudible to the human ear. When the distance measuring device 1 starts distance measurement processing in response to an instruction by a user, the output wave transmitting section 21 transmits the output wave P plural times at a constant time interval. In particular, in the present embodiment, the output wave transmitting section 21 transmits the output wave P plural times while the distance measuring device 1 is moving as described later.

The waveform data acquiring section 22 acquires waveform data of sound waves received by the microphone 14 (hereinafter, referred to as the received waveform data W) every time the output wave transmitting section 21 transmits the output wave P. In the sound waves received by the microphone 14, the reflected wave R caused by reflection of the output wave P by an object around the distance measuring device 1 is included. In addition, here, suppose that objects other than the target object T as the target of distance measurement also reflect the output wave P and thus the plural reflected waves R are included in the waveform data W received by the microphone 14 per one time of output wave P. Suppose that the waveform data acquiring section 22 executes signal processing on the waveform of the sound waves received by the microphone 14 to acquire the received waveform data W. In particular, by executing band-pass filter processing to extract a frequency corresponding to the frequency of the output wave P, the waveform data acquiring section 22 can obtain the received waveform data W including the intended reflected wave R.

The target wave identifying section 23 identifies the reflected wave R caused by reflection by the target object T from the plural reflected waves R included in the received waveform data W received by the waveform data acquiring section 22. Hereinafter, the reflected wave R caused by reflection by the target object T will be referred to as the target wave TR. A concrete example of the processing of identifying the target wave TR by the target wave identifying section 23 will be described in detail later.

The distance calculating section 24 identifies reception timing tx of the target wave TR on the basis of the transmission timing of the output wave P and calculates the distance from the distance measuring device 1 to the target object T by using this reception timing tx and the value of the propagation velocity of the sound waves in air. The reception timing tx corresponds to the time required from the transmission of the output wave P by the speaker 13 to the reception of the target wave TR identified by the target wave identifying section 23 by the microphone 14. In the present embodiment, as described above, the output wave transmitting section 21 transmits the output wave P plural times and, corresponding to this, the waveform data acquiring section 22 acquires plural pieces of received waveform data W. In this case, the target wave identifying section 23 identifies the target wave TR from the plural reflected waves R included in the received waveform data W acquired last, and the distance calculating section 24 calculates the distance to the target object T on the basis of the reception timing tx of this identified target wave TR. This allows the distance calculating section 24 to calculate the distance to the target object T at the present timing based on the latest received waveform data W.

The basic concept of the method for identifying the target wave TR by the target wave identifying section 23 will be described below. In the present embodiment, it is assumed that a user moves the casing of the distance measuring device 1 relative to the target object T in accordance with a predefined movement pattern while the speaker 13 is repeatedly transmitting the output wave P. The waveform data acquiring section 22 acquires plural pieces of received waveform data W in response to the plural output waves P transmitted while this movement of the distance measuring device 1 is being carried out. Among the plural pieces of received waveform data W obtained in this manner, a change arises in the reception timing of the reflected wave R in a manner according to the movement pattern required to the user. For example, as described later in detail, when the user moves the distance measuring device 1 in such a direction as to bring it closer to the target object T, the distance from the distance measuring device 1 to the target object T becomes shorter after the movement than before the movement and thus the reception timing of the reflected wave R (target wave TR) by the target object T becomes earlier. Accordingly, the target wave identifying section 23 identifies the target wave TR from the plural reflected waves R included in the received waveform data W on the basis of a determination criterion that is prescribed according to the movement pattern required to the user and relates to change in the reception timing of the reflected wave R.

Specifically, the output wave transmitting section 21 transmits at least two output waves P, a first output wave P1 and a second output wave P2, at timings different from each other. At this time, during the period from the transmission of the first output wave P1 to the transmission of the second output wave P2, the user moves the distance measuring device 1 with the predefined movement pattern. The waveform data acquiring section 22 acquires each of first received waveform data W1 received after the transmission of the first output wave P1 and second received waveform data W2 received after the transmission of the second output wave P2. In the first received waveform data W1, plural first reflected waves R1 caused by reflection of the first output wave P1 by objects around the distance measuring device 1 are included. Similarly, in the second received waveform data W2, plural second reflected waves R2 caused by reflection of the second output wave P2 by objects around the distance measuring device 1 are included.

Subsequently, about each of the plural first reflected waves R1 included in the first received waveform data W1, the target wave identifying section 23 identifies corresponding one second reflected wave R2 from the plural second reflected waves R2 included in the second received waveform data W2. Here, the second reflected wave R2 corresponding to a certain one first reflected wave R1 is the second reflected wave R2 assumed to be caused by reflection of the second output wave P2 by the same object as the object that has reflected the first output wave P1 to cause this first reflected wave R1. The correspondence relationship between the first reflected wave R1 and the second reflected wave R2 may be decided based on the order of appearance of each reflected wave R as counted from the transmission timing of the output wave P in each piece of received waveform data W for example. In this case, the target wave identifying section 23 associates the n-th first reflected wave R1 included in the first received waveform data W1 and the n-th second reflected wave R2 included in the second received waveform data W2 with each other. Alternatively, if the reception timing of the first reflected wave R1 corresponds with the reception timing of the second reflected wave R2 allowing a predetermined difference, the target wave identifying section 23 may associate both with each other. For example, suppose that the reception timing of the n-th first reflected wave R1 included in the first received waveform data W1 is tn on the basis of the transmission timing of the first output wave P1. In this case, if the second reflected wave R2 whose reception timing based on the transmission timing of the second output wave P2 is included in a range of tn±th exists in the second received waveform data W2, the target wave identifying section 23 associates this second reflected wave R2 with the n-th first reflected wave R1. Here, th is a given threshold and may be decided based on the upper-limit value of the general speed when the user moves the distance measuring device 1 and the time interval from the transmission of the first output wave P1 to the transmission of the second output wave P2. More specifically, th is decided as a value according to the time it takes for a sound wave to reciprocate over the maximum distance over which the distance measuring device 1 is assumed to move during the interval of the transmission of the output waves P. This is because, if the reception timings of the first reflected wave R1 and the second reflected wave R2 deviate beyond the amount of change assumed to be caused due to the movement of the distance measuring device 1 by the user, both are assumed to be the reflected waves R reflected by objects different from each other.

Moreover, the target wave identifying section 23 identifies the target wave TR from the plural second reflected waves R2 included in the second received waveform data W2 according to the change in the reception timing between each of the plural second reflected waves R2 included in the second received waveform data W2 and the corresponding first reflected wave R1. Specifically, in the present embodiment, it is assumed that the user moves the distance measuring device 1 relative to the target object T with a specific movement pattern. Thus, what kind of change is caused in each of the reception timings of the target wave TR and the other reflected waves R due to the movement is anticipated in advance. Therefore, the target wave identifying section 23 identifies, as the target wave TR, the second reflected wave R2 whose change in the reception timing relative to the corresponding first reflected wave R1 satisfies a given condition from the plural second reflected waves R2 included in the second received waveform data W2 in accordance with the predefined determination criterion relating to the change in the reception timing.

The target wave identifying section 23 may identify the target wave TR based on three or more pieces of received waveform data W acquired in response to three or more output waves P. In this case, about each of the plural reflected waves R included in one of the plural pieces of received waveform data W as the processing target, the target wave identifying section 23 identifies the reflected waves R corresponding to that reflected wave R from the other pieces of received waveform data W. Then, based on change in the reception timing of the reflected waves R associated with each other, the target wave identifying section 23 identifies the target wave TR from the plural reflected waves R included in the received waveform data W acquired last.

The method for identifying the target wave TR by the target wave identifying section 23 will be described in more detail below by taking as an example the case in which a user moves the distance measuring device 1 in such a direction as to bring it closer to the target object T. For example, when starting distance measurement processing, the distance measuring device 1 causes a message "Please move the device toward the target object" or the like to be displayed on the screen of the display unit 15. Thereby, the distance measuring device 1 requests the user to move the distance measuring device 1 along the direction from the distance measuring device 1 toward the target object T (i.e. direction perpendicular to the surface of the target object T). The output wave transmitting section 21 transmits the output wave P plural times while such movement is being carried out. This causes the waveform data acquiring section 22 to acquire plural pieces of received waveform data W received in states in which the distance measuring device 1 exists at positions different from each other.

Figure 4:
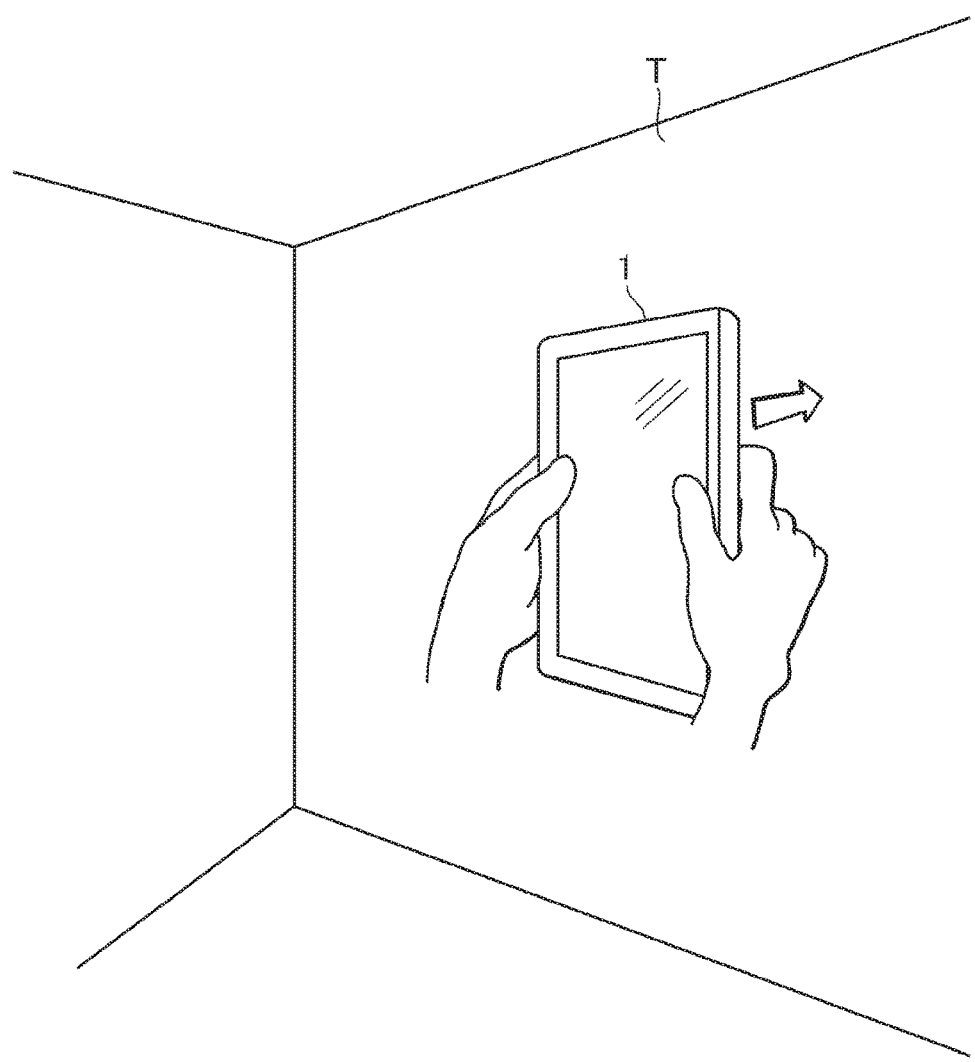
FIG. 4 is a diagram depicting how a user moves the distance measuring device.
Figure 5:
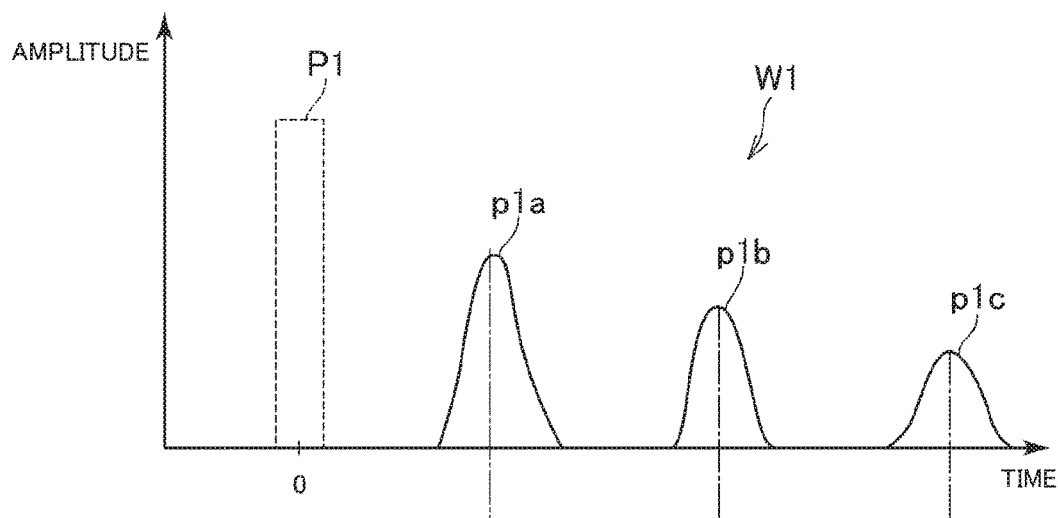
FIG. 5 is a diagram depicting an example of received waveform data received by the distance measuring device.
Figure 5:
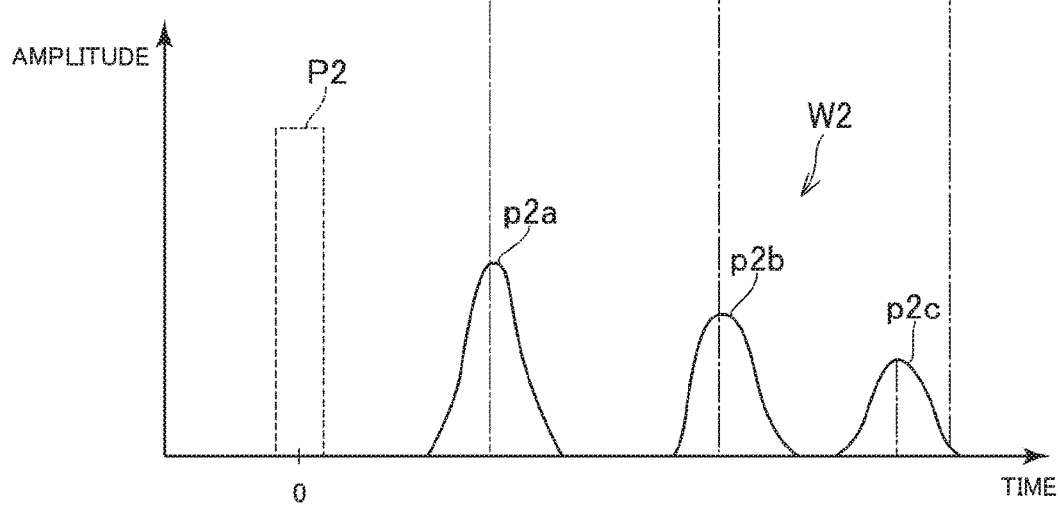
Figure 6:
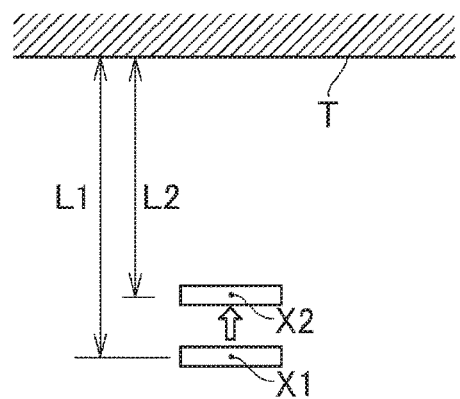
FIG. 6 is a plan view depicting the relationship between the positions of the distance measuring device before and after movement.

FIG. 4 is a diagram depicting how the user moves the distance measuring device 1. In the example of this diagram, a wall existing on the front side of the distance measuring device 1 is the target object T and the user moves the distance measuring device 1 straight toward the wall on the front side as shown by the arrow in the diagram. FIG. 5 depicts a concrete example of two pieces of received waveform data W1 and W2 acquired in the process of moving the distance measuring device 1 as exemplified in FIG. 4. Furthermore, FIG. 6 is a plan view depicting the relationship between the positions of the distance measuring device 1 at the timings when the pieces of received waveform data W1 and W2 are acquired. The received waveform data W1 shown on the upper side in FIG. 5 indicates waveform data acquired in response to the output wave P1 transmitted at the timing when the distance measuring device 1 exists at a position X1 at a distance L1 to the target object T as shown in FIG. 6. Furthermore, the received waveform data W2 on the lower side in FIG. 5 indicates waveform data acquired in response to the output wave P2 transmitted at the timing when the distance measuring device 1 exists at a position X2 at a distance L2 (L2<L1) to the target object T. The dashed lines in FIG. 5 indicate the waveform data of the output waves P1 and P2 themselves (waveform data of sound waves emitted from the speaker 13). Furthermore, in FIG. 5, the abscissa axis indicates the elapsed time from the transmission timing of the output wave P (t=0) as the reference timing and the ordinate axis indicates the amplitude of the received sound wave.

In this example of FIG. 5, three peaks p1a, p1b, and p1c are included in the received waveform data W1. Among these peaks, the peak p1a appearing immediately after the transmission timing of the output wave P1 (t=0) is a waveform obtained due to direct reception of the output wave P1 emitted from the speaker 13 by the microphone 14. The two peaks p1b and p1c subsequent thereto are waveforms based on the reflected waves R and the peak p1c appearing later in them is the target wave TR by reflection by the target object T. Furthermore, suppose that the second peak p1b is the reflected wave R by reflection by a floor surface. The received waveform data W2 also includes three peaks p2a, p2b, and p2c similarly to the received waveform data W1 and the peak p2c appearing last among them is the target wave TR.

As is apparent when the two pieces of received waveform data W1 and W2 are compared, the reception timings of the first peaks p1a and p2a are substantially identical and the reception timings of the second peaks p1b and p2b are substantially identical. However, in the reception timings of the third peaks p1c and p2c, a deviation is caused between the received waveform data W1 and the received waveform data W2. This is because the distance measuring device 1 gets closer to the target object T by the distance (L1−L2) and thus the reception timing of the target wave TR with respect to the output wave P2 becomes earlier than in the case of the output wave P1. On the other hand, even when the distance measuring device 1 is moved perpendicular to the wall surface as the target object T, the distance from the distance measuring device 1 to the floor surface hardly changes between before and after the movement. Therefore, the reception timing of the peak p1b and the reception timing of the peak p2b do not change. Accordingly, the target wave identifying section 23 identifies the reflected wave R whose reception timing changes between before and after the movement of the distance measuring device 1 as the target wave TR. In the case of FIG. 5, the third peak p1c included in the received waveform data W1 and the third peak p2c included in the received waveform data W2 are identified as the target wave TR. Then, based on the reception timing of the peak p2c, the distance calculating section 24 calculates the distance to the target object T at the timing when the distance measuring device 1 exists at the position X2.

In the example of FIG. 5, it is assumed that only the reflected waves R by the target object T (front wall) and the floor surface are observed. However, even if the reflected waves R by a ceiling and side walls are observed, the reception timings of these reflected waves R will not change between before and after the movement after all. This is because generally the distance measuring device 1 moves in parallel to these ceiling and side walls when the distance measuring device 1 is moved along the direction toward the target object T on the front side.

Furthermore, although the example in which the target wave TR is identified by using only the two pieces of received waveform data W is described here, the distance measuring device 1 may transmit the output wave P three or more times to acquire three or more pieces of received waveform data W, and identify the reflected wave R whose reception timing does not change by using all of these pieces of received waveform data W. This can identify the target wave TR more accurately.

Furthermore, in the above description, the user moves the distance measuring device 1 in such a direction as to bring it closer to the target object T. However, the distance measuring device 1 may be moved in such a direction as to get farther from the target object T. Also in this case, only the reception timing of the target wave TR changes between before and after the movement. However, in this case, the target wave TR after the movement is received at a later timing than the target wave TR before the movement.

Next, a description will be made about a concrete example of the processing of identifying the target wave TR by the target wave identifying section 23 by using plural pieces of received waveform data W.

As a first example, a description will be made about a method in which the target wave TR is statistically identified by identifying the reception timing of each peak included in the received waveform data W about each of plural pieces of received waveform data W acquired by the waveform data acquiring section 22.

Here, suppose that the output wave transmitting section 21 transmits N output waves P and, in response to this, the waveform data acquiring section 22 acquires N pieces of received waveform data W1 to WN. Furthermore, suppose that M peaks are included in each piece of received waveform data W. Hereinafter, the reception timing of the peak appearing as the m-th peak as counted from the transmission timing of the output wave P among the M peaks included in the n-th received waveform data Wn will be represented as t(n, m). Here, n=1, 2, . . . , N and m=1, 2, . . . , M. The target wave identifying section 23 determines that the m-th peaks included in a respective one of N pieces of received waveform data W are the reflected waves R corresponding to each other, and calculates a variance V(m) of the reception timings t(1, m) to t(N, m) thereof. By executing such processing about each of the M peaks, M variances are obtained. Then, if the peak whose value of the calculated variance is larger than a predetermined threshold exists, it is determined that the reception timing of the peak deviates over time, and thus the target wave identifying section 23 identifies this peak as the target wave TR. Here, the predetermined threshold is set to a value with which it can be discriminated whether or not the variation in the peak is attributed to the movement of the distance measuring device 1, in consideration of the general speed when the user moves the distance measuring device 1. The target wave identifying section 23 may determine peaks whose reception timings correspond to each other allowing a predetermined difference as the reflected waves R corresponding to each other instead of associating the m-th peaks included in the respective pieces of received waveform data W with each other as described above.

If plural peaks exist as the peaks whose variance value is larger than the predetermined threshold, the target wave identifying section 23 may identify the peak having the largest variance value among them as the target wave TR. Alternatively, the target wave identifying section 23 may identify the peak whose reception timing is the earliest (received at the timing closest to the transmission timing of the output wave P) as the target wave TR. Furthermore, in the calculation of the variance, if a peak whose reception timing greatly deviates from the reception timings in the other pieces of received waveform data W exists although the peak is the m-th peak, the target wave identifying section 23 may exclude the information of this peak as noise. In addition, the first peak included in each piece of received waveform data W is estimated to be not the reflected wave R but the peak obtained by direct reception of the output wave P as described above and therefore may be excluded from the target of the variance calculation.

Next, as a second example, a method of calculating the difference between two pieces of received waveform data W will be described. In this method, the target wave identifying section 23 employs consecutively-achieved two pieces of received waveform data W1 and W2 as the processing target and calculates the difference therebetween. In the case of peaks whose reception timings are substantially identical between both, when the difference in the waveform is calculated, the absolute value of the amplitude thereof is substantially zero. On the other hand, in the case of peaks whose reception timings involve a deviation, when the difference in the waveform is calculated, an S-shape waveform appears at the position of these peaks due to the deviation of the peaks. Therefore, the peak appearing as the S-shape waveform in the difference waveform can be identified as the target wave TR. Accordingly, the target wave identifying section 23 detects, from the difference waveform, a waveform pattern in which a peak whose absolute value surpasses a predetermined threshold appears and thereafter a reverse-polarity peak whose absolute value surpasses the predetermined threshold appears within a certain time. Then, the target wave identifying section 23 identifies the peak in the received waveform data W corresponding to the detected waveform pattern as the target wave TR.

Furthermore, the target wave identifying section 23 may decide which piece of received waveform data W among plural pieces of received waveform data W is used to identify the target wave TR by using the detection result of the motion sensor 17. A concrete example of such a method will be described below.

For example, the target wave identifying section 23 may determine whether or not the distance measuring device 1 is moving by using the motion sensor 17, and execute identification processing of the target wave TR like that described above by using the received waveform data W determined to be obtained in the movement. Even when transmission of the output wave P starts, the user does not necessarily move the distance measuring device 1 immediately. While the distance measuring device 1 is not moving, the reception timing of the target wave TR does not change. For this reason, the target wave identifying section 23 monitors the detection result of the motion sensor 17 while the output wave P is being repeatedly transmitted. Furthermore, during the period in which the movement of the distance measuring device 1 is not detected, the target wave identifying section 23 does not execute identification processing of the target wave TR in which attention is focused on deviation of the reception timing like the above-described processing, and selects the target wave TR from the received waveform data W on the basis of another criterion. Alternatively, the target wave identifying section 23 excludes the received waveform data W obtained in the period during which the movement of the distance measuring device 1 is not detected from the processing target and executes the identification processing of the target wave TR like the above-described processing by using only the received waveform data W acquired in a period determined as a period during which the distance measuring device 1 is moving. Thereby, the target wave TR can be identified more accurately.

Furthermore, by using the detection result of the motion sensor 17, the target wave identifying section 23 may determine whether the user correctly moves the distance measuring device 1 along the direction toward the target object T. In general, there is a case in which the user moves the distance measuring device 1 in a direction deviating from the direction toward the target object T although the user intends to move the distance measuring device 1 straight along the direction toward the target object T. In such a case, possibly deviation is caused also in the reception timing of the reflected wave R other than the target wave TR and it becomes impossible to correctly identify the target wave TR. Therefore, the target wave identifying section 23 determines whether or not the distance measuring device 1 is moving along the direction toward the target object T by using the detection result of the motion sensor 17.

In this case, the distance measuring device 1 requests the user to move the distance measuring device 1 in the state in which a predetermined surface of the distance measuring device 1 (e.g. back surface of the distance measuring device 1) is oriented toward the target object T. In response thereto, first the user holds the distance measuring device 1 in such a manner that the predetermined surface (e.g. back surface) of the distance measuring device 1 is opposed to the target object T. Then, in this state, the user moves the distance measuring device 1 along the direction toward the target object T. At this time, the target wave identifying section 23 determines whether or not the distance measuring device 1 is moving along the direction of the normal to the predetermined surface by using the detection result of the motion sensor 17. If it is determined that the movement direction of the distance measuring device 1 deviates from the direction of the normal to the predetermined surface by a predetermined angle or a larger angle, the target wave identifying section 23 does not use the received waveform data W acquired in this state for identification of the target wave TR. If it is determined that the deviation of the movement direction is smaller than the predetermined angle (i.e. both directions are substantially identical), the target wave identifying section 23 identifies the target wave TR by using the received waveform data W acquired in this state.

If it is determined that the movement direction of the distance measuring device 1 deviates from the direction of the normal to the predetermined surface by the predetermined angle or a larger angle, the target wave identifying section 23 may output a message that prompts the user to move the distance measuring device 1 again along the direction toward the target object T more accurately. Furthermore, a similar message may be output also in the case in which plural peaks are detected as peaks whose reception timing deviates among plural pieces of received waveform data W (e.g. peaks whose variance value is equal to or larger than a predetermined threshold) when the identification processing of the target wave TR described above is executed. This is because, when the plural reflected waves R whose reception timing deviates are observed, possibly the user is moving the distance measuring device 1 obliquely to the target object T.

Furthermore, if an object that reflects the output wave P exists also on the opposite side (back side) to the side oriented toward the target object T in the distance measuring device 1, a deviation of the reception timing will be caused also regarding the reflected wave R reflected by this object when the distance measuring device 1 is moved. Specifically, when the distance measuring device 1 is moved in such a direction as to get closer to the target object T, the reception timing of the target wave TR becomes earlier than before the movement but the reception timing of the reflected wave R from the back side becomes later than before the movement. Conversely, when the distance measuring device 1 is moved in such a direction as to get farther from the target object T, the reception timing of the target wave TR becomes later than before the movement and the reception timing of the reflected wave R from the back side becomes earlier than before the movement. In either case, because the reflected wave R whose reception timing deviates exists besides the target wave TR, it is difficult to identify the target wave TR based only on whether change in the reception timing is present or absent.

Then, when starting distance measurement processing, the target wave identifying section 23 may output a message that prompts the user to move the distance measuring device 1 in such a direction as to bring it closer to the target object T (or such a direction as to make it farther from the target object T). For example, when outputting a message that prompts movement to bring the distance measuring device 1 closer to the target object T, the target wave identifying section 23 identifies the reflected wave R whose reception timing after the movement is earlier than the reception timing before the movement as the target wave TR. Conversely, when outputting a message that prompts movement to make the distance measuring device 1 farther from the target object T, the target wave identifying section 23 identifies the reflected wave R whose reception timing after the movement is later than the reception timing before the movement as the target wave TR. This can identify the target wave TR while avoiding confusion with the reflected wave R reflected by an object on the back side of the distance measuring device 1.

Alternatively, the target wave identifying section 23 may output a message that prompts the user to move the distance measuring device 1 under the condition that the predetermined surface is oriented toward the target object T. If the user moves the distance measuring device 1 while holding the distance measuring device 1 with the predetermined surface opposed to the target object T, the target wave identifying section 23 can discriminate whether the distance measuring device 1 moves in the direction in which the predetermined surface is oriented or moves in the opposite direction on the basis of the detection result of the motion sensor 17. Accordingly, if the distance measuring device 1 moves toward the side toward which the predetermined surface is oriented, the target wave identifying section 23 identifies the reflected wave R whose reception timing becomes earlier as the target wave TR. Furthermore, if the distance measuring device 1 moves toward the opposite side to the predetermined surface, the target wave identifying section 23 identifies the reflected wave R whose reception timing becomes later as the target wave TR.

According to the distance measuring device 1 relating to the present embodiment described above, the user is caused to move the distance measuring device 1 and the reflected wave R whose reception timing involves a deviation is identified by using plural pieces of received waveform data W obtained in the process of the movement. Due to this, even when the plural reflected waves R are caused in response to one output wave P, the target wave TR by reflection by the target object T can be identified from them.

The distance to the target object T measured by the method described above is used to calculate the actual size of a subject photographed by a camera (not shown) included in the distance measuring device 1 for example. If the distance from the camera to the subject is found, the actual size of the subject can be calculated by using this distance and the size and position of the subject in an image taken by the camera. Therefore, the user can easily find the size (actual size) of a subject by photographing the subject by the camera and measuring the distance to the subject at the time.

Figure 7:
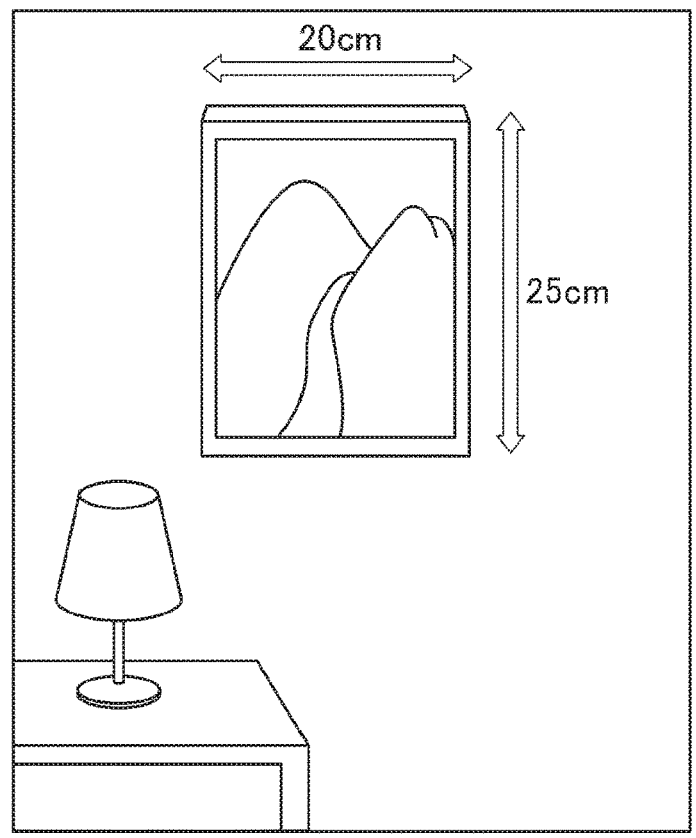
FIG. 7 is a diagram depicting a displaying example when the distance measuring device displays the size of a subject.

FIG. 7 depicts a displaying example when the distance measuring device 1 calculates the size of a subject by using the distance to the subject in this manner and displays the calculated size on the screen of the display unit 15. In the example of this diagram, a painting hung on a wall is imaged and the distance to the wall is measured to calculate the sizes of the painting in the vertical and horizontal directions. The range of the subject as the target of the size calculation here in the taken image may be automatically defined by image processing or the like or may be specified through operation input by the user.

The embodiment of the present invention is not limited to the one described above. For example, in the description made thus far, the target object T is a wall surface and the user moves the distance measuring device 1 toward the target object T in parallel to the ground surface. However, the target object T may be any as long as it has a reflective surface that reflects the output wave P. For example, the target object T may be a floor surface. Furthermore, although the user holds the distance measuring device 1 with a hand and moves it in the above description, the distance measuring device 1 may be moved by another method such as using a drive device for example.

Furthermore, although the distance measuring device 1 is moved along the direction toward the target object T in the above description, the target wave TR may be identified by moving it with another pattern. A concrete example of such a method will be described below.

Figure 8:
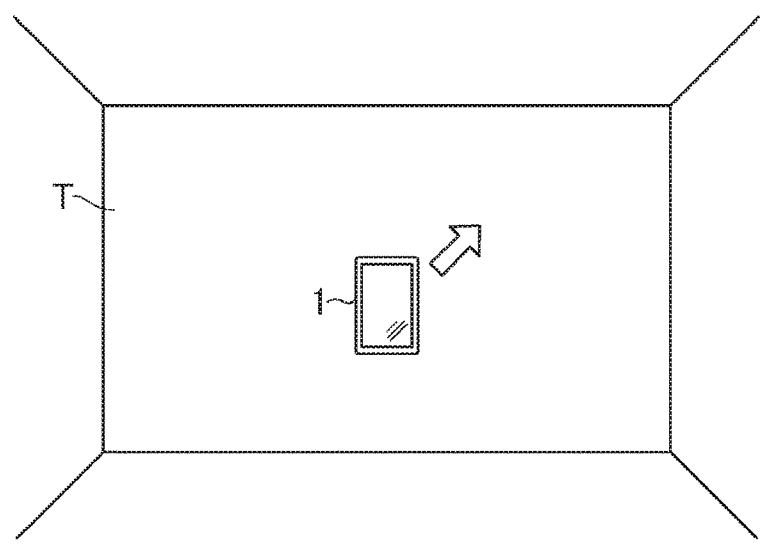
FIG. 8 is a diagram depicting a modification example of the pattern of moving the distance measuring device.

First, a pattern in which the distance measuring device 1 is moved in parallel to the surface of the target object T will be described by using FIG. 8. For example, if a front wall is the target object T, with this pattern, a user moves the distance measuring device 1 along a direction parallel to the target object T. In particular, in this pattern, it is preferable to move the distance measuring device 1 obliquely to a floor, a ceiling, and side walls as exemplified in FIG. 8 or to randomly move it in plural directions such as the upward-downward direction and the left-right direction. If such movement is carried out, the distances to the floor, the ceiling, and the side walls change in the process of the movement but the distance to the target object T does not change. Therefore, the target wave identifying section 23 identifies the reflected wave R whose reception timing does not change among plural pieces of received waveform data W as the target wave TR in contrast to the description made thus far. More specifically, for example, the target wave identifying section 23 executes processing of calculating the variances of the reception timings of the respective peaks similarly to the above-described example on plural pieces of received waveform data W acquired while it is determined that the distance measuring device 1 is moving based on the detection result of the motion sensor 17. Then, in contrast to the above-described example, the target wave identifying section 23 identifies the peak whose variance value is smaller than a predetermined threshold (i.e. peak whose reception timing does not change) as the target wave TR.

Another example of the movement pattern of the distance measuring device 1 will be described by using FIG. 9. In this pattern, a user moves the distance measuring device 1 in each of a first direction D1 and a second direction D2. Then, the target wave identifying section 23 identifies the target wave TR by using both a first waveform data group composed of plural pieces of received waveform data W acquired in the process of the movement in the first direction D1 and a second waveform data group composed of plural pieces of received waveform data W acquired in the process of the movement in the second direction D2.

Figure 9:
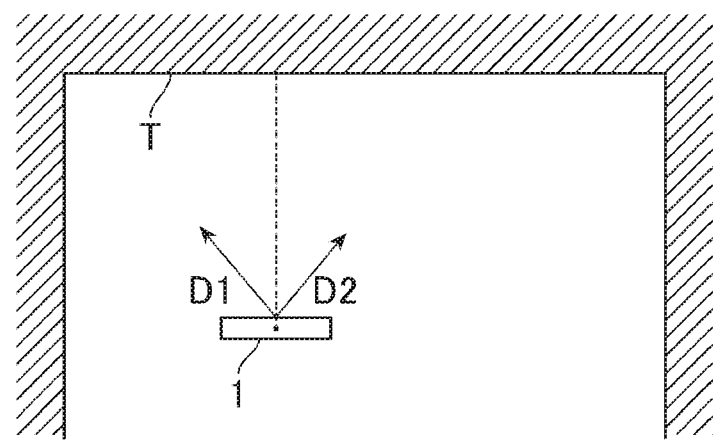
FIG. 9 is a diagram depicting another modification example of the pattern of moving the distance measuring device.

FIG. 9 is a diagram depicting the first direction D1 and the second direction D2 in this movement pattern and is a plan view when the target object T and the distance measuring device 1 are viewed from above. As depicted in FIG. 9, the first direction D1 and the second direction D2 are both a direction obliquely intersecting the direction toward the target object T (i.e. direction of the normal to the surface of the target object T). More specifically, the first direction D1 and the second direction D2 both include a vector component in such a direction as to get closer to the target object T. Moreover, the first direction D1 and the second direction D2 both include a vector component in a direction parallel to the surface of the target object T (i.e. direction perpendicular to such a direction as to get closer to the target object T), and the vector components are in opposite directions to each other between the first direction D1 and the second direction D2. In other words, the first direction D1 and the second direction D2 include vector components in opposite directions to each other across the direction from the distance measuring device 1 toward the target object T.

In the case of moving the distance measuring device 1 in the first direction D1, the reception timing of the target wave TR becomes earlier as the movement progresses. This is because the first direction D1 includes the vector component in such a direction as to get closer to the target object T. Furthermore, because the first direction D1 obliquely intersects the direction toward the target object T, the reception timings of other reflected waves R will also change. For example, in the case of moving the distance measuring device 1 in the first direction D1 in FIG. 9, the reception timing of the reflected wave R reflected by the left side wall becomes earlier along with the movement and the reception timing of the reflected wave R reflected by the right side wall becomes later. On the other hand, in the case of moving the distance measuring device 1 in the second direction D2, the reception timing of the target wave TR becomes earlier in the process of the movement just the same. This is because the second direction D2 also includes the vector component in such a direction as to get closer to the target object T. Furthermore, also in the case of the movement in the second direction D2, there is a possibility that the reception timing of the reflected wave R reflected by an object other than the target object T changes. However, this change in the reception timing is opposite to the change in the reception timing when the distance measuring device 1 is moved in the first direction D1. This is because the second direction D2 is the resultant vector of the vector component in the opposite direction to the first direction D1 and the vector component in the direction toward the target object T. Specifically, in the case of moving the distance measuring device 1 in the second direction D2, the reception timing of the reflected wave R reflected by the left side wall becomes later in the process of the movement and the reception timing of the reflected wave R reflected by the right side wall becomes earlier. For this, the target wave identifying section 23 identifies, as the target wave TR, the reflected wave R about which the reception timing involves a change in both the case of moving the distance measuring device 1 in the first direction D1 and the case of moving the distance measuring device 1 in the second direction D2 and the direction of the change (whether the reception timing becomes earlier or later) is identical between the case of the first direction D1 and the case of the second direction D2.

According to such a method, the flexibility in the movement direction can be made comparatively higher compared with the above-described method of identifying the target wave TR by moving the distance measuring device 1 in only one direction. That is, the user does not need to move the distance measuring device 1 along the direction toward the target object T strictly, and can identify the target wave TR if the user can move the distance measuring device 1 in two directions having such a vector component as to get closer to the target object T and vector components in opposite directions to each other.

This method of identifying the target wave TR by carrying out movement in the two directions is effective particularly in the case in which the user moves the distance measuring device 1 obliquely to the direction toward the target object T without intention. Accordingly, the target wave identifying section 23 may first attempt identification of the target wave TR by the method of moving the distance measuring device 1 toward the target object T as described above, and then identify the target wave TR by this method of causing the user to carry out movement in two directions if it is detected by the motion sensor 17 that the user moves the distance measuring device 1 obliquely to the predetermined surface or if plural reflected waves R whose reception timing deviates are detected in the process of the movement.

Here, the first direction D1 and the second direction D2 both include the vector component in such a direction as to get closer to the target object T. However, in contrast thereto, they may include a vector component in such a direction as to get farther from the target object T. In this case, the reflected wave R whose reception timing becomes later in both the case of the movement in the first direction D1 and the case of the movement in the second direction D2 is identified as the target wave TR. In FIG. 9, the first direction D1 and the second direction D2 include vector components in opposite directions to each other in the left-right direction. However, they may include vector components in opposite directions to each other in the upward-downward direction.

Furthermore, the method of identifying the target wave TR by carrying out movement in two directions, described here, may be used in combination with the above-described method of identifying the target wave TR by using the detection result of the motion sensor 17. For example, the target wave identifying section 23 may identify change in the reception timing of each reflected wave R in movement in each direction by using the received waveform data W acquired while it is detected that the user is moving the distance measuring device 1 by the motion sensor 17.

Moreover, in the above description, the distance measuring device 1 identifies the target wave TR from plural reflected waves R on the basis of change in the reception timing of the reflected wave R. However, instead of this, the distance measuring device 1 may identify the target wave TR based on the frequency of each reflected wave R included in the received waveform data W. In this case, the distance measuring device 1 makes an announcement to the user to cause to user to stop while orienting the distance measuring device 1 toward the target object T. The output wave transmitting section 21 outputs the first output wave P1 after the announcement of the stop. The first output wave P1 may be output plural times. When the user acts in accordance with the announcement, the first output wave P1 is output in the state in which the distance measuring device 1 is oriented toward the target object T and is at a stop. Thereafter, the waveform data acquiring section 22 acquires the waveform data of sound waves including plural reflected waves R caused by reflection of the first output wave P1. The waveform data acquiring section 22 executes predetermined noise processing and then calculates the frequency of the plural reflected waves R (peaks) included in the received waveform data W (first received waveform data W1) corresponding to the first output wave P1.

Next, the distance measuring device 1 makes an announcement to the user to move the distance measuring device 1 along the direction toward the target object T. The output wave transmitting section 21 outputs the second output wave P2 after the announcement of the movement. The second output wave P2 may be output plural times.

When the user acts in accordance with the announcement, the second output wave P2 is output in the state in which the distance measuring device 1 is moving along the direction toward the target object T. Thereafter, the waveform data acquiring section 22 acquires the waveform data of sound waves including plural reflected waves R caused by reflection of the second output wave P2. The waveform data acquiring section 22 executes predetermined noise processing and then calculates the frequency of the plural reflected waves R (peaks) included in the received waveform data W (second received waveform data W2) corresponding to the second output wave P2. Here, in the reflected wave R reflected by the target object T, the frequency changes between the reflected wave R of the first output wave P1 and the reflected wave R of the second output wave P2 due to the Doppler effect.

About each of the plural reflected waves R included in the first received waveform data W1, the target wave identifying section 23 identifies corresponding one reflected wave R from among the plural reflected waves R included in the second received waveform data W2. Then, the target wave identifying section 23 calculates the amount of change in the frequency from the corresponding reflected wave R included in the second received waveform data W2 about each reflected wave R included in the first received waveform data W1, and identifies the reflected wave R having the largest amount of change as the target wave TR.

The target wave identifying section 23 may identify the reflected wave R whose amount of change in the frequency surpasses a predetermined value as the target wave TR. The predetermined value in this case is set to a value with which the change in the frequency attributed to the movement of the distance measuring device 1 can be discriminated, in consideration of the general speed when the user moves the distance measuring device 1.

Furthermore, in the above description, the target wave TR is identified according to the change in the frequency of the reflected wave R between the first received waveform data W1 acquired in the stop state and the second received waveform data W2 acquired in movement. However, if the frequency of the reflected wave R that should be observed in the stop state (in-stop frequency) can be anticipated in advance according to the frequency of the output wave P, the distance measuring device 1 may identify the target wave TR by using only the received waveform data W acquired corresponding to the output wave P transmitted in movement. Specifically, the distance measuring device 1 acquires the received waveform data W in movement by making an announcement to the user to move the distance measuring device 1 similarly to the case of acquiring the above-described second received waveform data W2. Then, the distance measuring device 1 identifies, as the target wave TR, the reflected wave R whose frequency deviates from the in-stop frequency among plural reflected waves R included in the acquired received waveform data W. Similarly to the case of identifying the target wave TR based on change in the reception timing of the reflected wave R, the target wave identifying section 23 may identify the target wave TR according to the frequency of the reflected wave R included in the received waveform data W by using the received waveform data W acquired while the movement of the distance measuring device 1 is being detected by the motion sensor 17 among plural pieces of received waveform data W. Furthermore, the target wave identifying section 23 may identify whether the distance measuring device 1 is getting closer to or farther from the target object T by using the detection result of the motion sensor 17 and identify, as the target wave TR, the reflected wave R in which change in the frequency corresponding to the identification result (such a change as to increase the frequency or such a change to decrease the frequency) is caused.

REFERENCE SIGNS LIST

1: Distance measuring device
11: Control unit
12: Storing unit
13: Speaker
14: Microphone
15: Display unit
16: Operation unit
17: Motion sensor
21: Output wave transmitting section
22: Waveform data acquiring section
23: Target wave identifying section
24: Distance calculating section.

The invention claimed is:

1. A distance measuring device that measures distance to a target object, the distance measuring device comprising:
a speaker;
a microphone;
at least one memory configured to store computer program code;
at least one processor electrically connected to said at least one memory and configured to access said computer program code and operate as instructed by said computer program code, said computer program code including:
output wave transmitting code configured to cause at least one of said at least one processor to transmit an output wave a plurality of times from the speaker while the distance measuring device is moving;
waveform data acquiring code configured to cause at least one of said at least one processor to acquire waveform data of a sound wave that is received by the microphone every time the output wave is transmitted and includes a plurality of reflected waves caused by reflection of the output wave;
reflected wave identifying code configured to cause at least one of said at least one processor to identify, based on a plurality of pieces of the waveform data, a target wave reflected by the target object from among the plurality of reflected waves according to a change in reception timing of the target wave in the plurality of pieces of the waveform data; and
distance calculating code configured to cause at least one of said at least one processor to calculate a distance to the target object on a basis of reception timing of the target wave.

2. The distance measuring device according to claim 1,
wherein the output wave transmitting code is configured to cause at least one of said at least one processor to transmit the output wave a plurality of times while the distance measuring device is moving along a direction toward the target object, and
the reflected wave identifying code is configured to cause at least one of said at least one processor to identify a reflected wave whose reception timing changes among the plurality of pieces of waveform data, from among the plurality of reflected waves, as the target wave.

3. The distance measuring device according to claim 2,
wherein the reflected wave identifying code is configured to cause at least one of said at least one processor to output a message that prompts a user to move the distance measuring device again along the direction toward the target object if a plurality of reflected waves whose reception timing changes are detected.

4. The distance measuring device according to claim 1,
wherein the waveform data acquiring code is configured to cause at least one of said at least one processor to acquire a first waveform data group comprising a plurality of pieces of waveform data corresponding to a plurality of times of output wave transmitted while the distance measuring device is moving in a first direction and to acquire a second waveform data group comprising a plurality of pieces of waveform data corresponding to a plurality of times of output wave transmitted while the distance measuring device is moving in a second direction,
the first direction and the second direction both include a vector component along a direction toward the target object and a vector component of a parallel direction to a surface of the target object and vector components of the parallel direction, included in the first direction and the second direction, are in opposite directions to each other, and
the reflected wave identifying code is configured to cause at least one of said at least one processor to identify, as the reflected wave by the target object, a reflected wave about which reception timing changes in both the first waveform data group and the second waveform data group and a change direction of the reception timing in the first waveform data group and a change direction of the reception timing in the second waveform data group are identical.

5. The distance measuring device according to claim 1,
wherein the output wave transmitting code is configured to cause at least one of said at least one processor to transmit the output wave a plurality of times while the distance measuring device is moving along a direction parallel to a surface of the target object, and
the reflected wave identifying code is configured to cause at least one of said at least one processor to identify a reflected wave whose reception timing does not change among the plurality of pieces of waveform data, from among the plurality of reflected waves, as the target wave.

6. The distance measuring device according to claim 1,
wherein the distance measuring device includes a motion sensor that detects movement of the distance measuring device, and
the reflected wave identifying code is configured to cause at least one of said at least one processor to identify the target wave by using waveform data acquired while the motion sensor is detecting movement of the distance measuring device.

7. The distance measuring device according to claim 1,
wherein the distance measuring device includes a motion sensor that detects a movement direction of the distance measuring device relative to a predetermined surface thereof, and
the reflected wave identifying code is configured to cause at least one of said at least one processor to identify the target wave by using waveform data acquired while it is determined that the movement direction detected by the motion sensor corresponds with a direction from the distance measuring device toward the target object allowing a predetermined difference in angle.

8. A distance measuring device that measures distance to a target object, the distance measuring device comprising:
a speaker;

a microphone;

at least one processor;

output wave transmitting code configured to cause at least one of said at least one processor to transmit an output wave from the speaker while the distance measuring device is moving;

waveform data acquiring code configured to cause at least one of said at least one processor to acquire waveform data of a sound wave that is received by the microphone when the output wave is transmitted and includes a plurality of reflected waves caused by reflection of the output wave;

reflected wave identifying code configured to cause at least one of said at least one processor to identify, based on a plurality of pieces of the waveform data, a target wave reflected by the target object from among the plurality of reflected waves on a basis of a change in frequency of the target wave in the plurality of pieces of the waveform data; and distance calculating code configured to cause at least one of said at least one processor to calculate a distance to the target object on a basis of reception timing of the target wave.

9. A distance measuring method for measuring distance to a target object by using a distance measuring device including a computer processor, a speaker and a microphone, the distance measuring method performed at least in part by said computer processor and comprising:

transmitting an output wave a plurality of times from the speaker while the distance measuring device is moving, acquiring waveform data of a sound wave that is received by the microphone every time the output wave is transmitted and includes a plurality of reflected waves caused by reflection of the output wave, identifying, based on a plurality of pieces of the waveform data, a target wave reflected by the target object from among the plurality of reflected waves according to a change in reception timing of the target wave in the plurality of pieces of the waveform data, and calculating a distance to the target object on a basis of reception timing of the target wave.

10. A non-transitory computer readable medium storing a program that controls a distance measuring device including a speaker and a microphone to measure distance to a target object, the program causing the distance measuring device to: transmit an output wave a plurality of times from the speaker while the distance measuring device is moving, acquire waveform data of a sound wave that is received by the microphone every time the output wave is transmitted and includes a plurality of reflected waves caused by reflection of the output wave, identify, based on a plurality of pieces of the waveform data, a target wave reflected by the target object from among the plurality of reflected waves according to a change in reception timing of the target wave, and calculate a distance to the target object on a basis of reception timing of the target wave.

* * * * *